United States Patent
Russell

(10) Patent No.: US 10,061,398 B1
(45) Date of Patent: Aug. 28, 2018

(54) ERGONOMIC COMPUTER MOUSE

(71) Applicant: Jonathan Russell, Irving, TX (US)

(72) Inventor: Jonathan Russell, Irving, TX (US)

( * ) Notice: Subject to any disclaimer, the term of this patent is extended or adjusted under 35 U.S.C. 154(b) by 0 days.

(21) Appl. No.: 15/092,300

(22) Filed: Apr. 6, 2016

Related U.S. Application Data

(60) Provisional application No. 62/143,376, filed on Apr. 6, 2015.

(51) Int. Cl.
  *G06F 3/033* (2013.01)
  *G09G 5/08* (2006.01)
  *G06F 3/0362* (2013.01)

(52) U.S. Cl.
  CPC .......... *G06F 3/0334* (2013.01); *G06F 3/0362* (2013.01)

(58) Field of Classification Search
  None
  See application file for complete search history.

(56) References Cited

U.S. PATENT DOCUMENTS

| 2008/0129695 A1* | 6/2008 | Li ..................... G06F 3/03543 345/163 |
| 2009/0160775 A1* | 6/2009 | Vanden Heuvel .. G06F 3/03541 345/167 |

\* cited by examiner

*Primary Examiner* — Stephen T Reed
(74) *Attorney, Agent, or Firm* — Kenneth L. Tolar

(57) ABSTRACT

An ergonomic computer mouse for comfortably accommodating a user's foot includes a substantially circular pad having a planar upper surface, a planar lower surface and at least one peripheral edge. Outwardly extending from the peripheral edge are a pair of arms, each having a control button at a distal end that functions as either a "left" or "right" button found on a conventional mouse. On the upper surface of the housing are a plurality of peripheral, multi-directional arrows that, when depressed with a foot, move a cursor in a corresponding direction on the screen. Likewise, a centrally disposed zoom button can be manipulated with a foot to enlarge, reduce or scroll through displayed screen content. Accordingly, a user can completely control all typical mouse functions with a foot to prevent wrist and hand stress or injury.

12 Claims, 2 Drawing Sheets

ERGONOMIC COMPUTER MOUSE

CROSS REFERENCE TO RELATED APPLICATIONS

This application is entitled to the benefit of provisional patent application No. 62/143,376 filed on Apr. 6, 2015, the specification of which is incorporated herein by reference.

BACKGROUND OF THE INVENTION

The present invention relates to a flat, circular computer mouse that can be comfortably operated with a foot to prevent hand and wrist stress.

DESCRIPTION OF THE PRIOR ART

Computers are typically controlled with a bulbous, hand-operated mouse having one or more control buttons that are depressed with a user's fingers. Repeatedly operating a mouse significantly strains the hand and wrist, often leading to serious injuries, such as carpal tunnel syndrome. Accordingly, there is currently a need for a computer mouse will not strain a user's hand or wrist. The present invention addresses this need by providing a mouse formed of a planar pad having various control buttons that are manipulated with a user's foot in order to control a cursor on a computer display.

SUMMARY OF THE INVENTION

An ergonomic computer mouse includes a substantially circular pad having a planar upper surface, a planar lower surface and at least one peripheral edge. Outwardly extending from the peripheral edge are a pair of arms, each having a control button at a distal end thereof that functions as either a "left" or "right" button found on a conventional mouse. On the upper surface of the pad are a plurality of peripheral, multidirectional arrows that, when depressed with a foot, move a cursor in a corresponding direction on a computer screen. Similarly, a centrally disposed zoom button is manipulated with a foot to enlarge, reduce or scroll through displayed screen content. Accordingly, a user can perform all conventional mouse functions with a foot to prevent wrist and hand injury.

It is therefore an object of the present invention to provide an ergonomic computer mouse that prevents hand and wrist injury.

It is another object of the present invention to provide an ergonomic computer mouse that is completely operable with a user's foot.

Other objects, features and advantages of the present invention will become readily apparent from the following detailed description of the preferred embodiment when considered with the attached drawings and the appended claims.

DESCRIPTION OF THE PREFERRED EMBODIMENT

Figure 1:
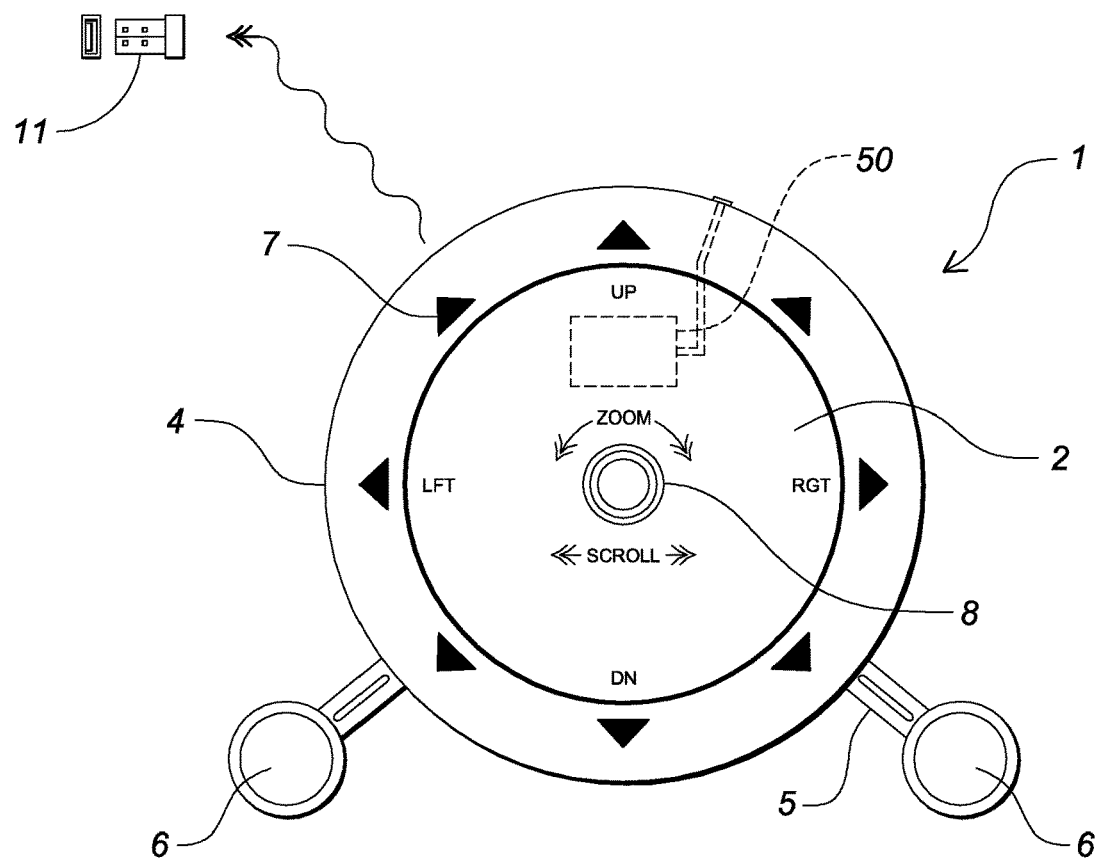
FIG. 1 is a top, plan view of the ergonomic computer mouse according to the present invention.
Figure 2:
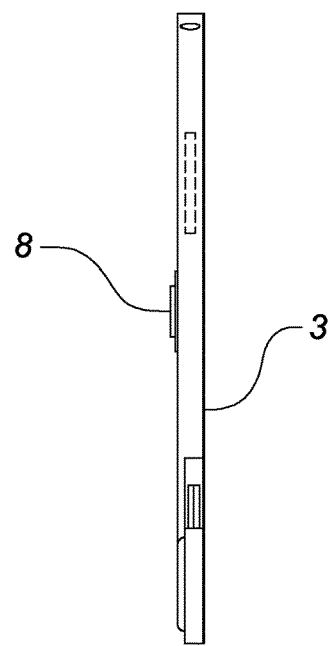
FIG. 2 is a side view of the computer mouse.
Figure 3:
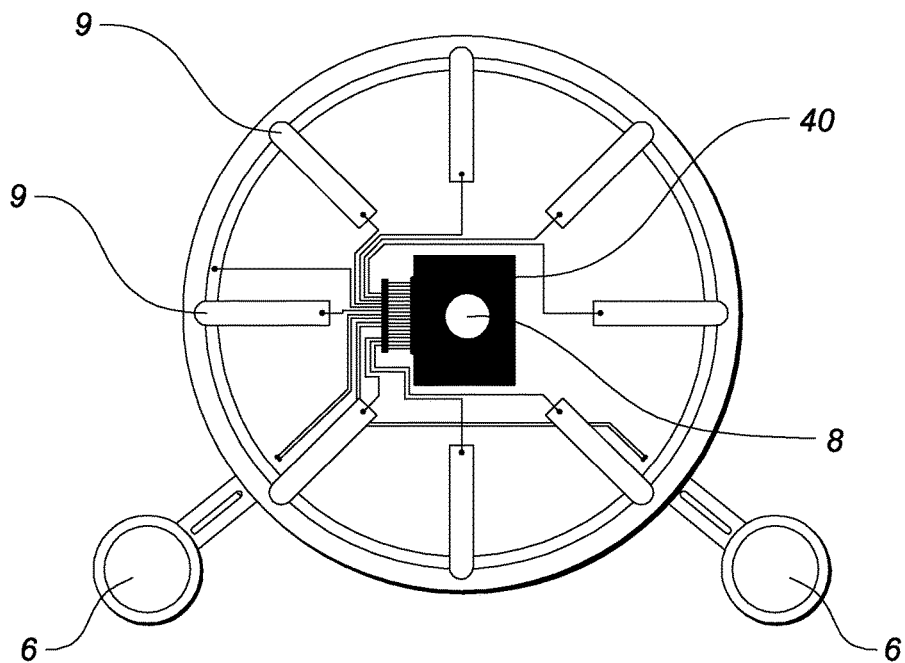
FIG. 3 is a top view of the computer mouse with the upper surface removed to expose the internal electrical components.
Figure 4:
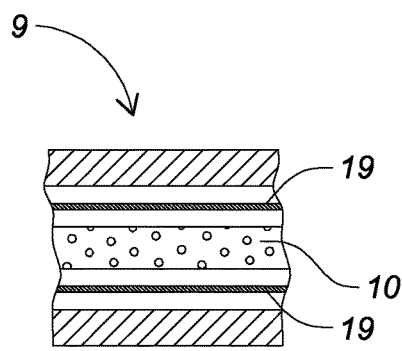
FIG. 4 is a sectional view of an exemplary pressure-sensitive switch.
Figure 5:
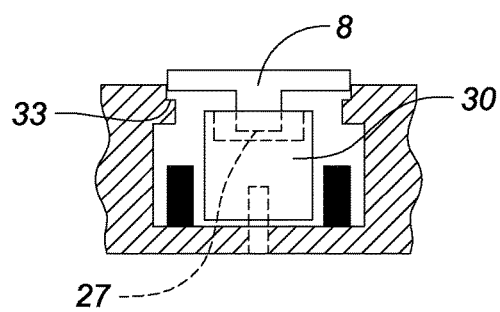
FIG. 5 is a sectional view of the scroll/zoom button mechanism.

The present invention relates to an ergonomic computer mouse comprising a substantially circular, thin pad 1 having a planar upper surface 2, a planar lower surface 3 and at least one peripheral edge 4. On the lower surface is a non-skid layer for stabilizing the housing on an underlying surface. Outwardly extending from the peripheral edge are a pair of arms 5, each having a control button 6 at a distal end. Each control button functions as either a "left" or "right" button found on a conventional handheld mouse. For example, a left button can reposition a cursor, cause the cursor to highlight text or can select links to redirect the screen to another website or to display embedded documents or photos. The right control button could generate a list of commands or formatting options specific to a discrete program or website being displayed on the computer monitor. Preferably, the arms are angularly adjustable relative to the pad to comfortably accommodate various users.

On the upper surface of the housing are a plurality of arrows and buttons that control the positioning of a cursor or the appearance of displayed screen content. For example, when depressed with a foot, a plurality of peripherally positioned, multidirectional arrows 7 move the cursor in a corresponding direction on the screen. The multidirectional arrows are each in communication with a microprocessor printed-circuit-board (PCB) 40 connected to a sensor that is formed of pair of spaced switch elements 19, with an insulating, pressure-sensitive rubber layer 10 therebetween. When the upper surface of the pad above an arrow is compressed, the resistance decreases significantly to allow electrical conduction between the two switch elements, which moves the cursor in the corresponding direction.

Centrally positioned on the upper surface of the pad is a zoom button 8 that, when rotated in either direction with the operator's foot, either enlarges or reduces the screen content. By laterally sliding a foot on the zoom button in either direction, a user can scroll upwardly or downwardly through the displayed content. An internal optical sensor 30 detects the rotational or lateral movement of a pin 27 depending from the zoom button 8 to manipulate the screen accordingly. A pair of ledges 33 immediately beneath the zoom button prevent significant vertical displacement from a user's foot while also forming a bearing surface that assures smooth rotational and lateral movement. The zoom button also provides a resting area for the user's foot to prevent inadvertent depression of a directional arrow.

The microprocessor also includes a wireless transmitter, such as that commonly marketed and sold under the trademark Bluetooth®. The transmitter is in select wireless communication with a wireless receiver associated with a desired computer. The receiver could be a dongle 11 or similar attachment coupled with a USB port. All of the electronics are powered with a rechargeable battery 50 or the mouse could be powered directly by a computer via a USB cable. Accordingly, a user can completely control all typical mouse functions with a foot to prevent wrist and hand stress or injury.

The above-described device is not limited to the exact details of construction and enumeration of parts provided herein. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. An ergonomic computer mouse comprising:
   a pad having a planar upper surface, a planar lower surface and at least one peripheral edge;
   a pair of arms outwardly extending from the peripheral edge of said housing, each of said arms having a control button at a distal end, each of said control buttons in communication with a computer and a cursor appearing on a computer monitor, each of said control buttons performing a discrete function when depressed with a user's foot to reposition said cursor and to control content appearing on said computer monitor.

2. The ergonomic computer mouse according to claim 1 further comprising a plurality of multidirectional arrows peripherally positioned on the upper surface of said pad, each of said arrows, when depressed, moving the cursor in a direction corresponding to a direction that said arrows are pointing.

3. The ergonomic computer mouse according to claim 2 further comprising a rotatable and laterally movable zoom button on the upper surface of said pad that, when rotated in either direction with the user's foot, enlarges or reduces content depicted on said computer monitor, and when laterally moved, scrolls upwardly and downwardly through content depicted on said computer monitor.

4. The ergonomic computer mouse according to claim 3 wherein said pad includes an internal optical sensor that detects rotational and lateral movement of the zoom button to manipulate the content depicted on said computer monitor.

5. The ergonomic computer mouse according to claim 2 further comprising:
   a microprocessor in communication with said multidirectional arrows, said microprocessor including a pair of spaced switch elements with an insulating, pressure-sensitive layer therebetween whereby when an area of the upper surface of the pad above one of said arrows is depressed, a resistance between said spaced switch elements decreases to allow electrical conduction therebetween to move the cursor in a predefined direction.

6. The ergonomic computer mouse according to claim 5 wherein said microprocessor further includes a wireless transmitter in select wireless communication with a wireless receiver associated with said computer to establish communication between said microprocessor and said cursor.

7. The ergonomic computer mouse according to claim 1 further comprising a non-skid layer on the lower surface of said pad for stabilizing the pad on an underlying surface.

8. The ergonomic computer mouse according to claim 1 wherein said pad is circular.

9. The ergonomic computer mouse according to claim 1 wherein said arms are angularly adjustable relative to the pad.

10. The ergonomic computer mouse according to claim 1 wherein one of said control buttons functions as a left button on a handheld mouse and another of said control buttons functions as a right button found on the handheld mouse.

11. The ergonomic computer mouse according to claim 3 further comprising a pair of ledges immediately beneath the zoom button that limit vertical displacement from a user's foot while also forming a bearing surface that assures smooth rotational and lateral movement.

12. In combination with a computer having a monitor for displaying content and a movable cursor for controlling and manipulating the content displayed on said monitor, an ergonomic computer mouse comprising:
   a substantially circular pad having a planar upper surface, a planar lower surface and at least one peripheral edge;
   a pair of control buttons extending from the peripheral edge of said pad, each of said control buttons in communication with said cursor, each of said control buttons performing a discrete function when depressed with a user's foot to reposition said cursor and to control content appearing on said computer monitor;
   a plurality of multidirectional arrows on the upper surface of said pad and in communication with said cursor, each of said arrows, when depressed with a user's foot, moving said cursor in a discrete direction on said computer monitor.

* * * * *